US006060220A

United States Patent [19]
Snortland

[11] Patent Number: 6,060,220
[45] Date of Patent: May 9, 2000

[54] METHOD FOR PRODUCING AN OPTICAL INFORMATION CARRIER HAVING A VARIABLE RELIEF STRUCTURE

[75] Inventor: Howard J. Snortland, Stanford, Calif.

[73] Assignee: The Board of Trustees of the Leland Stanford Junior University, Palo Alto, Calif.

[21] Appl. No.: 08/873,515

[22] Filed: Jun. 12, 1997

Related U.S. Application Data

[63] Continuation of application No. 08/499,829, Jul. 10, 1995, abandoned.

[51] Int. Cl.⁷ .................................................. C25D 11/12
[52] U.S. Cl. ........................ 430/320; 430/321; 430/945; 430/394; 205/70; 205/122; 205/135; 205/175
[58] Field of Search .................................. 430/320, 321, 430/945, 394, 324; 369/275.3, 275.4, 277; 205/69, 70, 76, 111, 112, 120, 122, 135, 175, 176

[56] References Cited

U.S. PATENT DOCUMENTS

| | | | |
|---|---|---|---|
| 2,443,119 | 6/1948 | Rubin | 205/135 |
| 3,875,026 | 4/1975 | Widmer | 204/27 |
| 3,894,179 | 7/1975 | Jacobs | 178/6.6 R |
| 3,922,420 | 11/1975 | Schnable et al. | 205/122 |
| 4,080,267 | 3/1978 | Castellani et al. | 205/70 |
| 4,088,490 | 5/1978 | Duke et al. | 205/135 |
| 4,161,752 | 7/1979 | Basilico | 358/128 |
| 4,454,014 | 6/1984 | Bischoff | 205/135 |
| 4,861,699 | 8/1989 | Wijdenes et al. | 430/321 |
| 4,963,464 | 10/1990 | Setani | 430/495 |
| 5,029,023 | 7/1991 | Bearden et al. | 369/69 |
| 5,144,552 | 9/1992 | Abe | 369/275.4 |
| 5,168,490 | 12/1992 | Braat | 369/109 |
| 5,234,571 | 8/1993 | Noeker | 205/70 |
| 5,235,587 | 8/1993 | Bearden | 369/106 |
| 5,330,880 | 7/1994 | Horigome et al. | 430/321 |

FOREIGN PATENT DOCUMENTS

| | | | |
|---|---|---|---|
| 0612062 | 8/1994 | European Pat. Off. | 369/275.4 |
| 61-188756 | 8/1986 | Japan | 369/275.4 |
| 64-3838 | 1/1989 | Japan | 369/275.4 |
| 1-224949 | 9/1989 | Japan | 369/275.4 |
| 2-149952 | 6/1990 | Japan | 369/275.4 |
| 2-234431 | 9/1990 | Japan | 205/135 |
| 3-100942 | 4/1991 | Japan | 369/275.4 |

OTHER PUBLICATIONS

Keizer, E.O., "Videodisc Mastering", RCA Review, vol. 39(1), pp. 60–86, Mar. 1978.

(List continued on next page.)

*Primary Examiner*—Martin Angebranndt
*Attorney, Agent, or Firm*—Lumen Intellectual Property Services

[57] ABSTRACT

A method for making a master used in the production of optical information carriers having a relief structure, the relief structure representing data. The steps to obtain the relief structure involve: covering a substrate with a first blocking material, removing the first blocking material in a predetermined pattern to produce a first set of open regions where the substrate is exposed and a set of closed regions where the substrate remains covered, and growing an active material layer in a first subset of the first set of open regions to a predetermined thickness, that thickness representing a first data value. The active material is grown by anodization or electroplating in the open regions. The invention also provides for covering the active material layer, removing predetermined portions of the first blocking material to uncover a second subset of open regions, and growing the active material in that second subset of open regions to a thickness representing a different data value. Alternatively, the active material may be left uncovered when a second set of open regions is created and all of the open regions can be grown together.

9 Claims, 9 Drawing Sheets

OTHER PUBLICATIONS

Franklin, R.H., "Electroforming metal mask process", IBM Tech. Discl. Bull., vol. 14(3) p. 742, Aug. 1971.

R.H. Franklin "Electroforming metal mask" IBM Tech. Discl. Bull. 14(3) p. 742 (Aug. 1971).

D.J. Elliott, "Integrated Circuit Fabrication Technology" pp. 165–173 (© 1982).

H. Kroger, L.N. Smith and D.W. Jillie, Selective niobium anodization process for fabricating Josephson tunnel junctions, Applied Physics Letters 39(3), Aug. 1, 1981, pp. 280–282.

Fredric A. Lownheim, Electroplating, McGraw Hill, 1978, pp. 8–19, 191–205.

Stanley, Wolf, Richard N. Tauber, Silicon Processing for the VLSI Era, vol. 1, Lattice Press, pp. 406–455, 502.

L. Young, Anodic Oxide Films, Academic Press, 1961, pp. 4–45, 89–101.

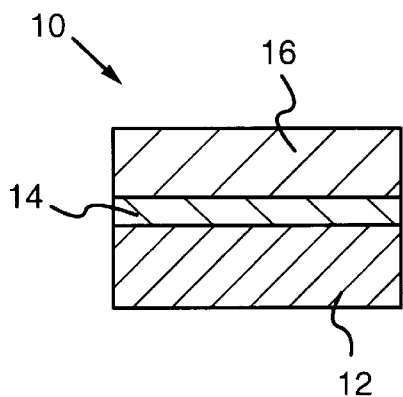
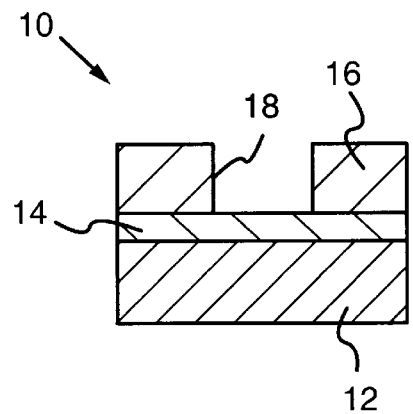
FIG. 1A  FIG. 1B
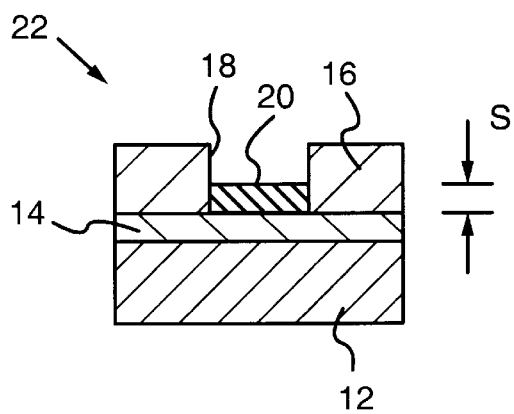
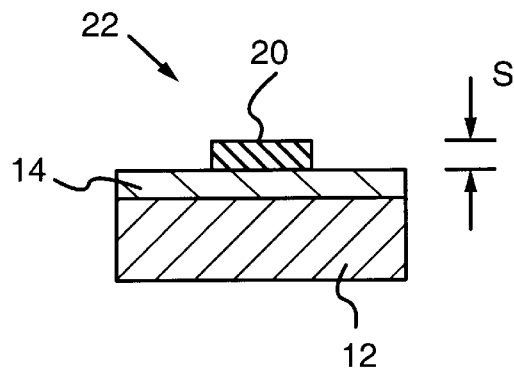
FIG. 1C  FIG. 1D

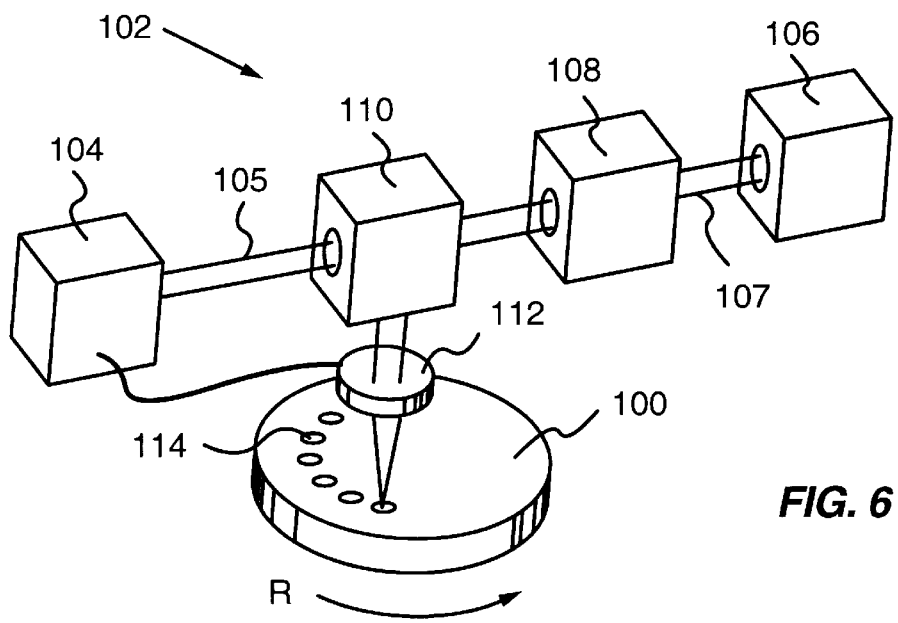
FIG. 6
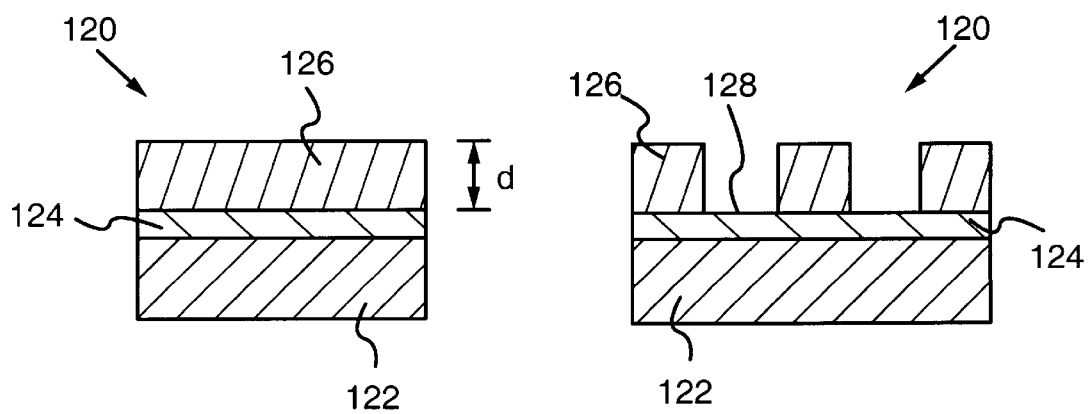
FIG. 7A   FIG. 7B

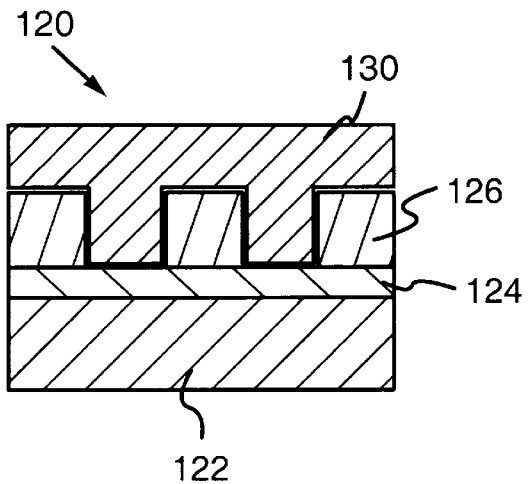
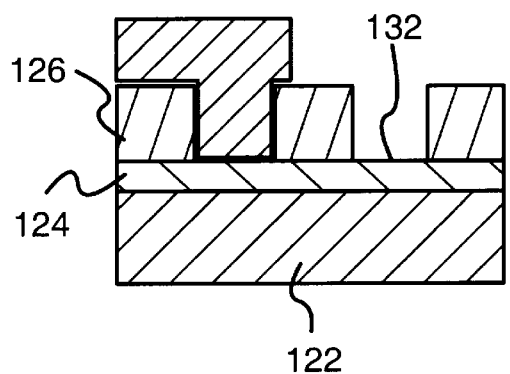
FIG. 7C          FIG. 7D
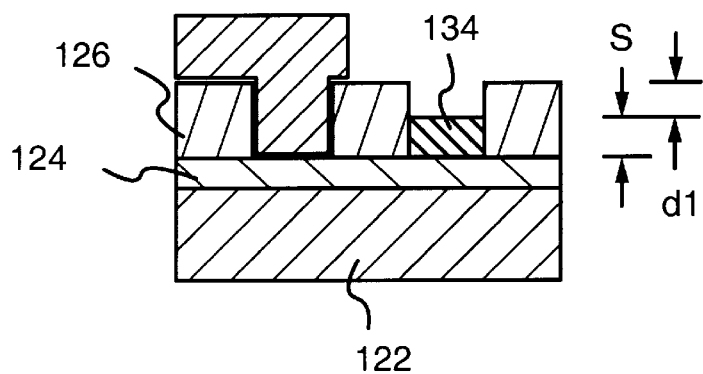
FIG. 7E

METHOD FOR PRODUCING AN OPTICAL INFORMATION CARRIER HAVING A VARIABLE RELIEF STRUCTURE

This application is a continuation of application Ser. No. 08/499,829, filed Jul. 10, 1995, now abandoned.

BACKGROUND

1. Field of the Invention

The present invention relates to the field of optical storage media, and in particular to a method for producing an optical information carrier having a variable relief structure representing read-only data.

2. Description of Prior Art

Optical storage media, in particular optical disks, are a promising form of static and dynamic data storage. Optical disks containing read-only data, otherwise known as CD ROM disks, are especially well-suited for high-density permanent storage. These read-only devices are used for preserving large amounts of information, such as audio and video recordings, reference materials, etc. Currently there exists a need for optical data carriers having surface features with more than one displacement from the surface plane. A typical CD-ROM disk, on the other hand, has only one such displacement, which is typically ¼ wavelength, $\lambda g$, of the reading light used as measured in the medium of the disk's protective coat. Certain physical limitations under this design exist which vitiate the reliability of tracking as well as the packing density of data-bearing pits. In addition, the pits themselves have only one possible depth, in effect allowing only 1 bit of data to be represented per unit length of pit.

Proposed technologies exist in the art both for alleviating the tracking reliability problem and increasing the data storage density. Tracking solutions include the use of a guide groove of a different optical depth than the data bearing pits, e.g., as described by Abe in U.S. Pat. No. 5,144,552. Data storage capacity may be improved by either the use of a multi-depth data pit, which increases the number of bits per unit of pit length, as described by Bearden in U.S. Pat. Nos. 5,029,023 and 5,235,587, or by reducing the track-to-track spacing. In the latter case, alternate tracks of data pits are embossed with different optical depths so as to reduce the crosstalk from adjacent tracks and allow reliable reading. Techniques for forming such data pits are described in prior art, e.g., by Basilico in U.S. Pat. No. 4,144,752, Setani in U.S. Pat. No. 4,963,464, and Braat in U.S. Pat. No. 5,168,490.

A method for producing such a variable relief structure is required. Such a method exists in the art and is described by Wijdenes in U.S. Pat. No. 4,861,699. This method relies on using multiple layers of positive photoresist with interleaved optically absorbent separators. The idea is that by exposing the surface with a variable intensity light source all photoresist layers exposed above their respective photo-scission thresholds will be developed away leaving a pit whose depth is controlled by the intensity of the impinging light. This method suffers from the limitation that only certain, relatively deep steps may be produced due to the coverage properties of spin-cast photoresists. Typical spin casting produces photoresist layers in the 600 to 1700 nm range. More importantly, because the success of the method depends upon exposing only the desired number of upper layers past their photo-scission thresholds, a great degree of uniformity in photoresist sensitivity, photoresist light absorption and separator layer light absorption is required, both from batch to batch and across the surface of the coated disk. This will place an upper bound on the number of steps that can be produced.

OBJECTS AND ADVANTAGES OF THE INVENTION

In view of the above, the principal object of the invention is to increase the storage capacity and transfer rate for data by providing for multiple pit depths in optical carriers. According to the invention the pits are uniformly spaced so that the tracking and focusing system does not require bandwidth restrictions in the duty cycle of the pits.

Another object of the invention is to enable one to produce blank masters by lithographic methods, thus rendering them suitable for mass production and quality control.

Another object of the invention is to provide a method of fabrication for conventional CD-ROMs with guide grooves for improved tracking reliability or staggered track depths for better packing density of data bearing pits.

The invention also teaches how to use anodization to ensure highly accurate thickness control and a self-flattening effect of oxide surfaces. Next the invention teaches how to use electroplating methods to reduce the number of exposure passes and greatly speed up the mastering process. Additionally, a "track and focus while burning" exposure system guarantees cost-efficient and accurate mastering without high precision tracking and focusing arrangements.

Yet another object of the invention is to present a method for producing masters which can be used in standard pressing techniques to produce duplicates.

These and other objects and advantages will become more apparent after consideration of the ensuing description and the accompanying drawings.

SUMMARY OF THE INVENTION

The advantages of the invention are achieved by a method for making a master used in the production of optical information carriers having a relief structure. The relief structure represents data. The steps to obtain the relief structure involve: covering a substrate with a first blocking material, removing the first blocking material in a predetermined pattern to produce a first set of open regions where the substrate is exposed and a set of closed regions where the substrate remains covered, and growing an active material layer in a first subset of the first set of open regions to a predetermined thickness, that thickness representing a first data value.

The first blocking material is a positive- or a negative-type radiation-sensitive coating. For positive coatings the removing step comprises selectively exposing the coating to radiation according to the predetermined pattern, such that upon developing the radiation-sensitive material the first set of open regions forms in response to the electromagnetic radiation and the set of closed regions is formed where the coating was unexposed. The situation is reversed for the negative coating. The radiation used in the exposure is preferably constituted by cathode rays or ultraviolet light.

Upon creating the set of open regions and closed regions, the method calls for covering the first blocking material with a second blocking material, and removing the second blocking material according to a predetermined pattern to uncover an open subset of the first set of open regions and preserve covered a closed subset of the set of closed regions. In a preferred embodiment the substrate has a top layer made of a metal and the growing step comprises depositing the active material layer by electroplating. Typically, the active material layer is made of a material such as nickel, chromium, copper, zinc, cadmium, tin, gold, silver, or platinum.

In another embodiment of the invention the method of substrate has a top layer made of a metal and the growing step comprises depositing the active material layer by anodization. For this embodiment the active material is preferably chosen from the group including: $Ta_2O_5$, $Nb_2O_5$, $Al_2O_3$, $ZrO_2$, $HfO_2$, $WO_3$, $Bi_2O_3$, $Sb_2O_3$, BeO, MgO, $SiO_2$, $GeO_2$, $SnO_2$, $TiO_2$, and $UO_2$.

The invention further envisions covering the active material layer the first blocking material to plug up the first subset of the first set of open regions, removing predetermined portions of the first blocking material to uncover a second subset of the first set of open regions, and, finally, growing the active material layer in the second subset of the first set of open regions to a predetermined thickness representing a second desired data value.

Obviously, there are many different ways in which the desired regions can be opened and closed. Also, there are numerous techniques provided for by the method of the invention to grow the active material layer in the open regions. The geometrical distribution of the open regions (e.g., circular, spiral, etc.) can also be altered depending on the application. The details of the method are presented in the specification and make reference to the attached drawing figures.

BRIEF DESCRIPTION OF THE DRAWINGS

FIG. 1 are cross sectional views illustrating the production of simple positive relief master from a blank master.

FIG. 6 is a tracking exposure system for multiple exposures of masters.

FIG. 7 are cross sectional views illustrating the production and development of a blank negative relief master.

DESCRIPTION

Figure 2:
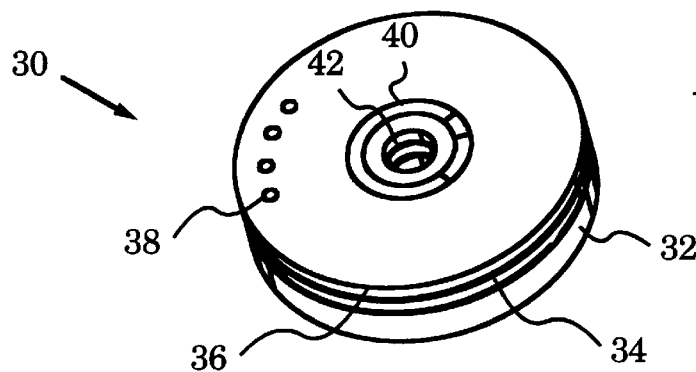
FIG. 2 is a perspective view of a master being produced from a blank carrier.

In a particularly simple embodiment of the invention we can produce a data carrier with an arbitrary positive relief structure as is shown in FIGS. 1A through 1D.

As shown in FIG. 1A, a blank data carrier 10 consists of a "valve" metal 14 deposited on a suitable substrate 12. For simplicity, only a portion of blank carrier 10 is shown. Substrate 12 may be made of polished glass and be sputter-coated with niobium or tantalum, representing metal 14. A silicon wafer can also serve as substrate 12. Obviously, a blank of solid metal 14 could be used as well, but a smooth surface is easier to obtain with the glass or silicon substrate. The sputtered metal layer should be at least ½ the height of the highest relief desired.

When used in an electrolyte cell, "valve" metal 14 is marked by its tendency to form an oxide coat (not shown), rather than evolve gaseous oxygen. Typical metals 14 which can be used in blank data carrier 10 include tantalum, niobium, aluminum, zirconium and, in some cases, hafnium, tungsten, bismuth, antimony, beryllium, magnesium, silicon, germanium, tin, titanium, and uranium. The oxide coat formed may be made smooth and non-porous by the choice of the electrolyte used. More detailed information about this topic can be found in the handbook by L. Young entitled *Anodic Oxide Films*, Academic Press, 1961. For example, for Niobium, a good electrolyte, can be made by mixing 1120 ml ethylene glycol, 760 ml water and dissolving 156 gm ammonium pentaborate, as taught by H. Kroger et al. in Applied Physics Letters 39(3) Aug. 1, 1981, pp 280–282. For tantalum, as simple an electrolyte as a 0.2 normal solution of sulfuric acid in water is suitable, although the addition of a wetting agent to provide for good contact in small features is desirable. This is provided by the presence of ethylene glycol in the preceding recipe.

Figure 3:
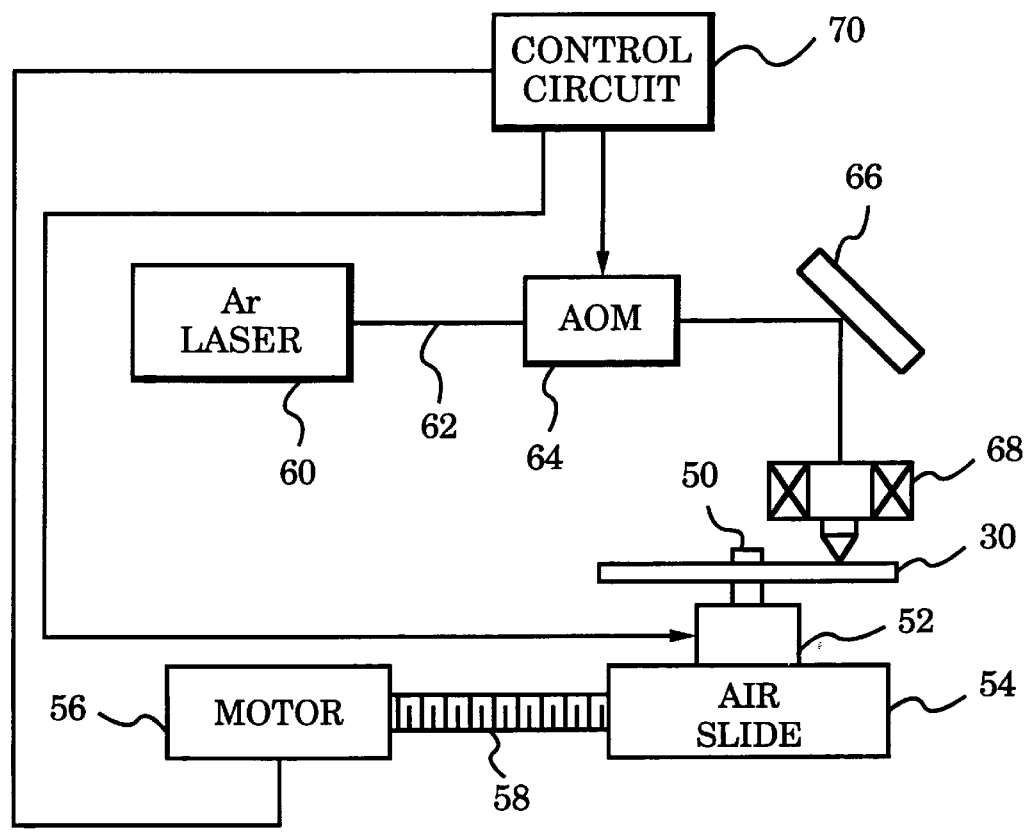
FIG. 3 is a conventional exposure system.

The ready blank data carrier 10 is coated with a photoresist 16 of positive or negative sensitivity. Thus, blank carrier 10 may be exposed with either masked ultraviolet light, in a conventional exposure system as shown in FIG. 3 and described by Jacobs in U.S. Pat. No. 3,894,179, or an electron-beam exposure system. In the case of a positive sense photoresist 16, exposure produces an open region or hole 18, as illustrated in FIG. 1B. In a negative sense photoresist 16, exposed areas harden and remain, producing holes 18 in all unexposed regions. This process is best described by S. Wolf and R. Tauber in *Silicon Processing for the VSLI Era*, Lattice Press, 1986. Photoresists are typically spin coated and must be applied in a thickness at least equal to the highest relief structure desired. A suitable positive sense photoresist is Shipley 1400-27.

FIG. 1C shows a portion of an optical master 22 produced from blank carrier 10 of FIG. 1B. Open region 18 contains active material or oxide film 20 of certain thickness s.

In practice, blank carrier 10 from which master 22 is produced is preferably a blank disk 30, as shown in FIG. 2. Blank disk 30 has a substrate 32, a metal layer 34 made of a valve metal, and a top layer of a photoresist 36. In FIG. 2 photoresist is already removed to expose a set of open regions or holes 38 (only four holes 38 are shown in the figure for clarity). It is convenient that holes 38 be arranged in a circular or spiral pattern, though other arrangements are possible.

A ring-shaped contact 40 is centrally positioned on disk 30 and surrounds a clamping hole 42. Contact 40 establishes an electrical connection to metal layer 34 and is preferably made of a patterned gold film. Clamping hole 42 serves for holding and rotating disk 30.

As mentioned above, the step of removing photoresist 36 to uncover holes 38 and produce ready-to-anodize blank disk 30 can be conveniently performed with the exposure arrangement of FIG. 3. In particular, blank disk 30 is placed on a turntable spindle 50 of turntable driving motor 52 mounted on an air slide 54. A stepper motor 56 with a lead screw 58 moves the turntable motor 52 on air slide 54 thus allowing tracks of data to be written.

A light source 60 delivers a light beam 62 for exposing photoresist 36. In this case source 60 is an Ar laser. Of course, any other light source capable of delivering radiation for exposing photoresist 36 can be used. Light beam 62 passes through modulator 64 and is guided by optics 66 to focusing unit 68. In the simple arrangement of FIG. 3 control mechanism 64 is an acousto-optic modulator (AOM) and optics 66 are constituted by a reflector.

A control circuit 70 is connected to AOM 64, to turntable motor 52, and to stepper motor 56. During operation, circuit 70 controls the disk rotation speed via turntable motor 52, the track positioning via stepper motor 56, and the duty cycle of exposing light 62 via AOM 64 to produce the desired holes 38.

Once blank disk 30 has the required holes 38 extending down to metal layer 34, information can be stored on it to produce optical master 22. This is preferably done by controlled anodization inside an anodization cell 80 as shown generally in FIGS. 4A and 4B. Cell 80 consists of a bottom plate 82 for supporting blank disk 30. A first O-ring 84 is placed around the outer circumference of blank disk 30 and a second O-ring 86 is placed around contact 40.

Cell 80 has an external dielectric cylinder 88 and a concentric inner dielectric cylinder 90. External cylinder 88 fits tightly against first O-ring 84 (see FIG. 4B), while inner cylinder 90 seals against second O-ring 86. Thus, the volumes contained between cylinders 88 and 90 and inside cylinder 90 are sealed from each other. In-practice, first O-ring 84 and second O-ring 86 can be permanently attached to cylinders 88 and 90. In fact, any technique for efficiently sealing off the volumes between cylinders 88 and 90 can be implemented.

A ring-shaped cathode 92 is mounted around inner cylinder 90 above blank disk 30. A first lead 94, guided between cylinders 88 and 90 to a negative voltage source (not shown) is connected to cathode 92. A second lead 96 is attached to contact 40 on disk 30. Lead 96 is routed through cylinder 90 to a positive voltage source (not shown).

In assembled cell 80 (FIG. 4B), the volume between cylinders 88 and 90 is filled with an electrolyte 98. For niobium or tantalum, a suitable electrolyte is given above. For higher current densities, the electrolyte should be agitated to provide a uniform temperature.

During anodization cathode 92 is maintained at a negative potential and contact 40 is connected to a positive potential. Since contact 40 is electrically joined to metal layer 34, the bottoms of all exposed holes 38 are held at the positive potential applied to contact 40. This causes oxygen ions to flow through electrolyte 98 and form a metal oxide layer 20 inside holes 38. The thickness s of oxide layer 20 is controlled by the duration of the anodization process and is discussed in detail below.

In a constant current mode, the thickness of metal oxide layer 20 produced is directly proportional to the voltage across cell 80, thus providing a convenient feedback of film growth and easy end point detection. If it is desired to anodize through and thus consume entire "valve" metal layer 34 the end point can be detected by an abrupt jump in the voltage across cell 80. Other than the consumption of un-anodized metal, the only upper bound for anodized oxide thickness is the dielectric breakdown strength of photoresist material 16. For the above mentioned resist, a strength of 1800 Volts per mil is typical. For a 1.4 micron thick resist coat on niobium this is about 150 nm oxide corresponding to 100 Volts.

Figures 4A, 4B:
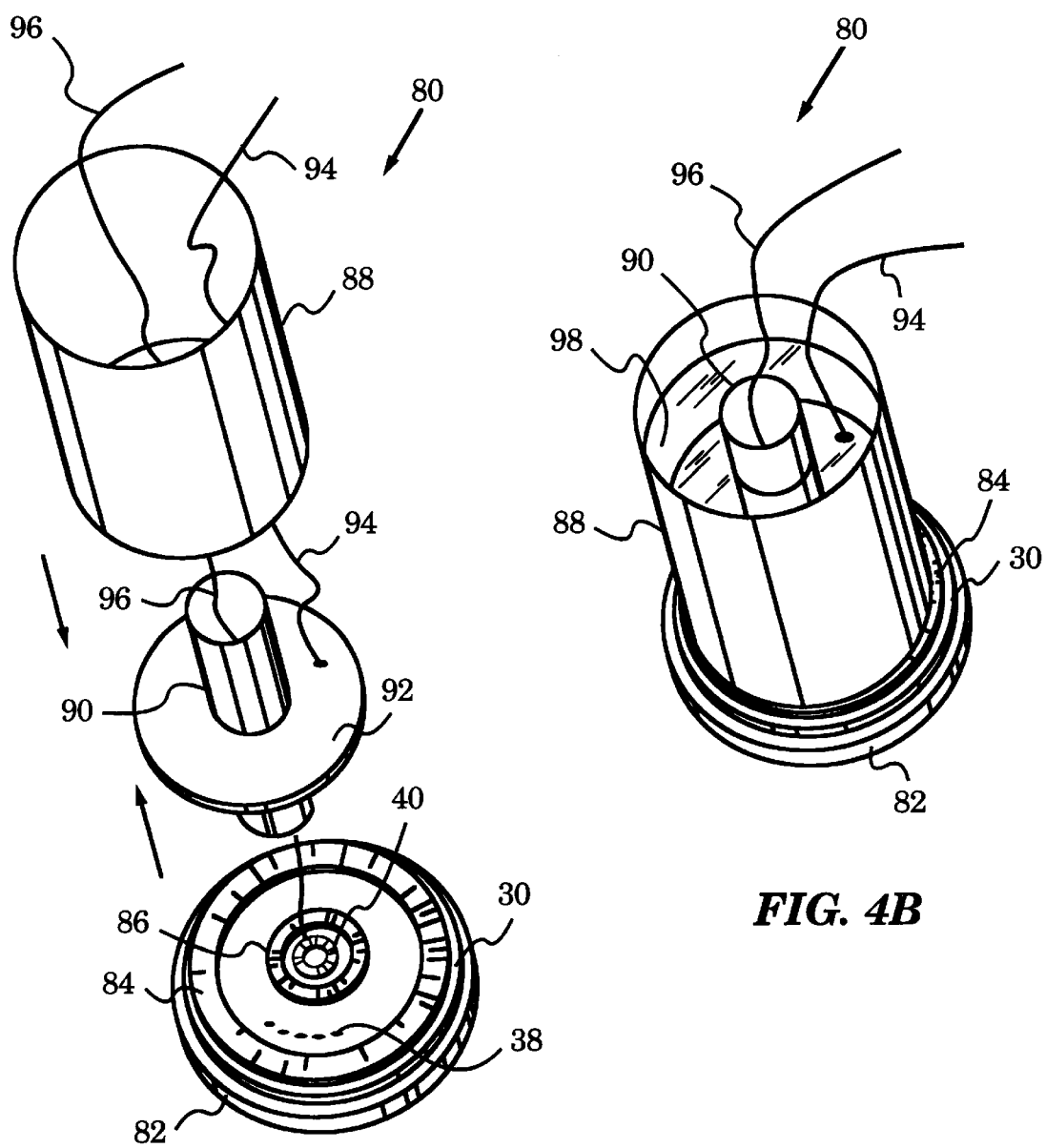
FIG. 4 is an exposed master placed in an electrolytic cell for the growth of the anodized oxide coat.

To provide for a well-determined anodization current density j, the total current i=j*total open area on disk 30. The total open area on disk 30 is the area of exposed holes 38. Electrolytic cell 80 must allow current only to sink into the opened areas in photoresist 16. For this reason, cell 80 shown in FIGS. 4A and 4B provides O-ring 86 to keep electrolyte 98 off contact ring 40.

After anodizing holes 38 to the desired thickness s, the photoresist is stripped, exposed, a new set of open regions uncovered and the anodization process repeated. The result in shown in FIG. 1D. The process then can be repeated to produce as many relief levels as needed.

After the relief structure has been produced it may be replicated by standard means used for the production of CD's such as described in U.S. Pat. No. 3,894,179 to Jacobs. Typically, this is achieved by depositing a conductive layer via sputtering, evaporative deposition, or an "electroless" chemical process and then electroforming sufficient Nickel or other metal to produce a robust "mother" for making further electroformed replicas or for direct stamping in to moldable plastic.

Figure 5:
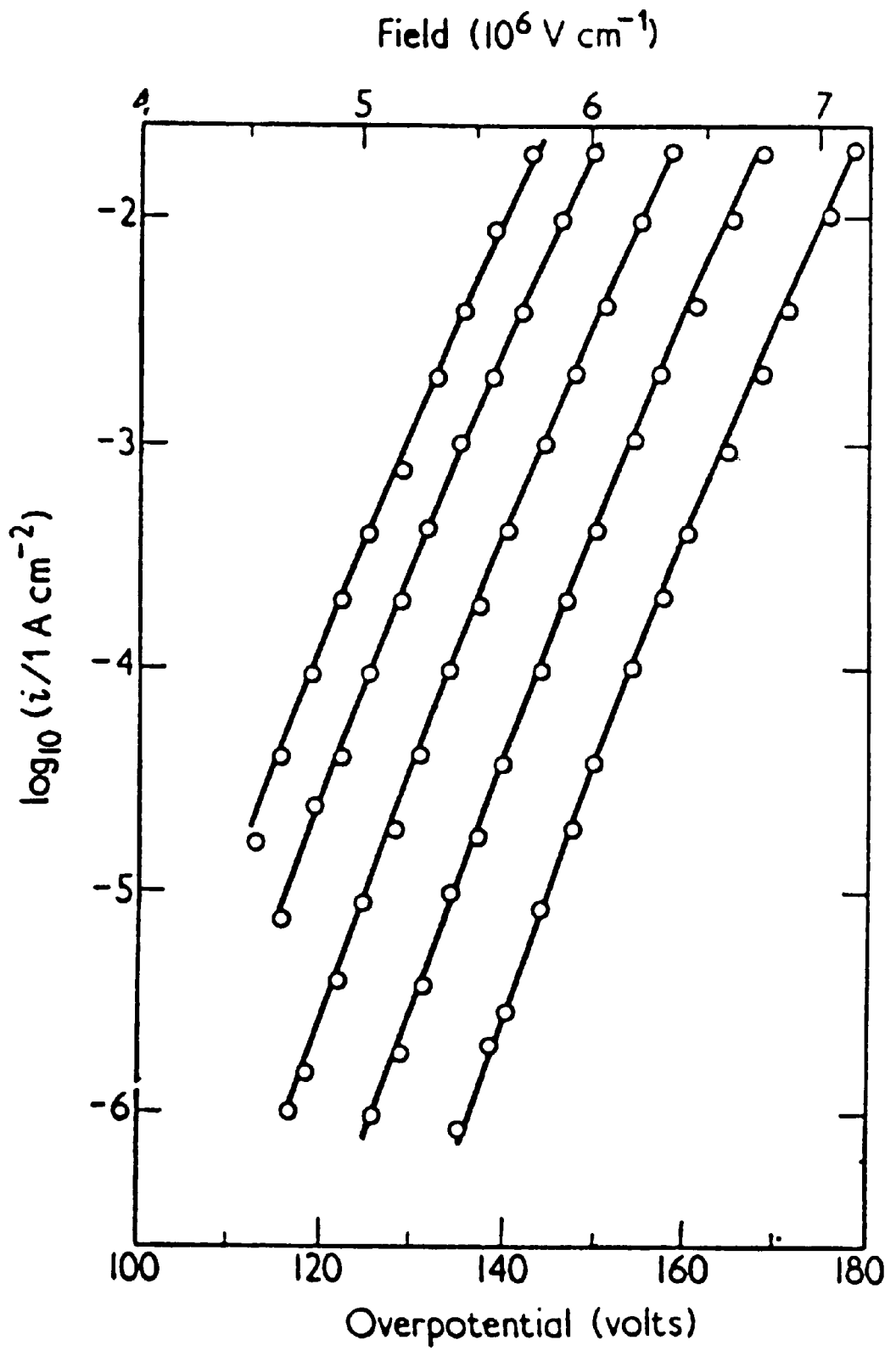
FIG. 5 is typical data for anodization of Tantalum metal.

Anodization may be done in either constant current, or constant voltage mode. In the former, usually most desirable case, the thickness s of oxide layer 20 produced is proportional to the voltage across cell 80. The proportionality constant is a slow function of local current density j, temperature, and the metal used. For a current density of 0.5 mA/cm$^2$ into niobium, the constant is 1.5 nm per volt (see Kroger). Such constants are typically well characterized and are available in the literature. Data for tantalum with an oxide thickness of 2490 Å in 0.2 Normal $H_2SO_4$ are shown in FIG. 5 (see Young ). The curves are from right to left for 0° C., 25° C., 50° C., 75° C., and 94° C.

FIG. 5 presents data in a form known as a "Tafel Plot", which is suited for the depiction of field-assisted thermally-activated transport phenomena. The significance of this is discussed next.

Anodization of valve metals has an additional property highly desirable for data carrier production as can be seen by considering anodization in constant voltage mode. In that case:

$$ds/dt = A*j = B*exp[V*C/(T*s)]$$

where V is the Voltage between the electrolyte and the film, j is the electrode current density, s is the oxide coat thickness, T is the temperature, t is the time and A, B, and C are proportionality constants dependent on the metal. The constant B also has a slow temperature dependence. The rate at which the oxide thickness increases drops off with thickness s. As a result, the momentarily thinner regions of a growing oxide film grow thicker faster than thick ones. This results in a "self-smoothing" property to film growth (see Young). If we examine the preceding equation and write it in the form:

$$log_{10}(j/j_{00}) = log_{10}(B/(A*j_{00})) + V*C*log_{10}(e)/(T*s)$$

where $j_{00}$ is a standard current density of 1 A/cm$^2$, then the utility of the Tafel plot becomes clear. The experimental data indeed obey the linear voltage dependence predicted over several orders of magnitude in current density, thus illustrating dramatically the precision of anodization process. The leftmost data, for example, are neatly fit by the choice of coefficients: $B/A = 10^{-16.04}$ A/cm$^2$ and $C = 1.57244*10^5$ Kelvin*Å/V, where C has a slight temperature dependence as tending to keep all curves with the same slope.

In a further refinement of this procedure for data storage, a blank disk 100 may be anodized to produce a first relief structure, typically a tracking groove, recoated with positive photoresist and exposed using a mastering device 102 as depicted in FIG. 6. Mastering device 102 uses a conventional CD-ROM reader's infrared tracking and focusing system 104 to generate an IR tracking beam 105 and an ultraviolet exposure system to supply a UV exposure beam 107.

The exposure system includes an ultra-violet source 106 and an acousto-optic modulator 108. A beam-splitter 110 is used to coaxially unite tracking beam 105 and exposure beam 107. A lens system and focus servo 112, in the simplest case represented by a single objective lens, ensure proper focusing of the groove in the surface. An intermittent UV beam 107, pulsed with the aid of electro-optic modulator 108, exposes, and unplugs selected regions 114 for subsequent anodization. During this exposure step disk 100 is rotating as indicated by arrow R. This method of exposure is possible due to fact that typical positive (e.g., novolac-diazonaphthoquinone) photoresists are exposed by ultraviolet light of wavelengths shorter than 500 nm. This makes it possible to send the infrared thru the photoresist without exposing it (see Tauber).

Anodizing, Masked, Negative

In another embodiment of the invention a negative relief master is produced from a blank 120 as shown in FIGS. 7A through 7E. This is achieved by starting with a substrate 122 metallized with a "valve" metal coating 124, as in the above embodiment, and spin coated with a negative-sense photoresist 126. A suitable resist is KTI 747. If desired, PMMA may also be used with appropriate adjustment of the sense of the exposure, as explained below. In either case, photoresist 126 should be as thick as the deepest desired negative relief. This thickness is called d. Coated blank 120 as shown in FIG. 7A is exposed (for the negative resist case) and developed to produce a pattern of open regions 128 as shown in FIG. 7B. The pattern used must be the superset of all subsequent regions to be anodized. In the case of a simple train of variable depth pits, the initial pattern would be a spiral (or concentric) trail of holes 128. In the case of PMMA, the sense of the exposure would have to be reversed so as to produce the same pattern of open regions 128. In either case, upon development, the resulting surface constitutes "blank" master 120. Note that such blank masters may be mass produced lithographically, assuming the same superset pattern applies to all.

To produce the specific pattern of data, blank master 120 is next coated in a conventional, medium UV positive photoresist 130, e.g., Shipley 1400-27. The coated blank 120 is shown in FIG. 7C. FIG. 7D shows blank 120 after exposure and development bearing a first subset of open regions 132 forming the relief structure. For clarity, only one of the subset of open regions 132 is indicated in FIG. 7D. This subset can correspond to data pits whose intended data value is 1, or to a tracking groove.

The surface is then placed in anodization cell 80 shown in FIG. 4 and an oxide coat 134 of thickness t is produced by oxidizing through the aligned open regions 128 in the underlying negative photoresist layer and the upper positive photoresist layer. The pit floor is thus raised by anodization until the depth $d_1 = s - d$ is decreased to the level desired as shown in FIG. 7E. Positive photoresist layer 126 is then stripped, a fresh coat recoated and the exposure and anodization process repeated until all desired depths $d_1 \ldots d_N$ have been produced. Either masks or the "track and burn" system depicted in FIG. 6 may be used to perform the multiple exposures.

A distinct advantage of this permanent negative photoresist "screen" layer is that the subsequent positive photoresist "selector" layers serve only to selectively plug and unplug certain of its holes. This allows all relief structures to have their precise locations be determined by the screen layer; the exposure of the positive "selector" layer can thus be somewhat sloppy. As long as the screen layer hole for a structure is fully unplugged by the selector's exposure and "slop-over" of this exposure doesn't inadvertently open adjacent structure's holes, the relief structure's footprint will have the full precision of the screen layer. This allows relaxed tolerance of alignment of the selector layers exposures.

In all cases the initial underlying layer of patterned negative photoresist or PMMA remains. The reasoning in choice of materials should now also be clear. Negative photoresists are hardened by exposure to UV and thus the underlying layer will not have additional holes created during the exposure of the upper positive coatings. PMMA, on the other hand, is a short wavelength (<215 nm) positive photoresist and is thus insensitive to the longer (325 nm) radiation used for the overlying resist. In either case, both PMMA and negative photoresists are developed by non-aqueous solvents and are not affected by the aqueous solutions of KOH used for medium wavelength positive photoresists. In practice PMMA is preferable to negative photoresists for lithography under 1 or 2 microns, as negative resists are prone to swelling upon development (see Tauber).

Positive Relief with Hole Mask Removed

In another embodiment of the invention, a positive relief surface may be produced by proceeding exactly as in the above embodiment and then, as a final step, stripping off the underlying negative photoresist layer to leave the oxide mesas free standing. For negative photoresist, a suitable stripping agent is Microstrip. For PMMA, plasma-ashing with oxygen may be used. A particular advantage of the anodization of niobium metal is that both metal and the oxide $Nb_2O_5$ are refractory materials and extremely resistant against chemical attack. Prolonged agitation with concentrated hydrofluoric acid (HF) is required to etch $Nb_2O_5$. The wet etching of niobium may be accomplished with a 50:50 mixture of concentrated nitric and hydrofluoric acids.

Standard Negative with Electroplating

In another embodiment of the invention, one with several particular advantages, we begin, as in the first embodiment, with the substitution of an easily electroplated metal for a "valve" metal in the initial metallized substrate. Suitable choices include nickel, chromium, copper, zinc, cadmium, tin, gold, silver, or platinum. In this case, the thickness of the initial layer on the glass or silicon substrate need only be great enough to provide satisfactory conductivity to all portions of the disk during electroplating.

Next, a PMMA or negative photoresist layer is spun on and patterned to provide the underlying "screen" layer as above. Positive photoresist "selector" layers are applied and exposed as above. The relief structure, however, is to be grown by electroplating the chosen metal through the coincident screen and selector holes. In this case, the master is placed in an electrolytic cell substantially identical to that shown in FIG. 4; the sole changes being that the polarity of the electrolytic cell must be reversed and the cell outfitted an electrolyte as described below and with an anode of the chosen metal. As the anode is consumed in the process of deposition onto the master, care should be taken to choose an anode thick enough to provide metal source for a conveniently large number of use cycles of the cell.

To perform the structure growth the electroplating cell is connected to a constant current source supply with the blank as the cathode. The current density is calculated as above and must be kept small enough to ensure a "bright" deposit as well as high cathode efficiency for metal used. In the case of copper, sulfate electrolytes may be used resulting in allowable current densities from 30 to 60 $mA/cm^2$. Further, detailed information is found in the handbook *Electroplating* by Frederick Lowenheim, McGraw Hill, 1978. Fluoroborate electrolytes may also be used. Cyanide and pyrophosphate electrolytes are somewhat problematic as their pH's are slightly alkaline and can act as a developer for positive photoresist. This effect will cause the positive to dissolve if it has not been kept under safelight conditions after the initial exposure and development.

Under the above conditions, the thickness of the metal deposited is given by:

$$s=10*W*j*t/(Z*\rho*e*N_a)$$

where s is the thickness of metal deposited in microns, W is the atomic weight of the metal, j is the current density applied in mA/cm$^2$, t is the total time in seconds of current application, Z is the valence number of the metal ion in solution in the electrolyte bath, $\rho$ is the density of the metal in grams/cm$^3$, e is the electron charge in Coulombs ($1.602*10^{-19}$ C), and $N_a$ is Avogadro's number ($6.023*10^{23}$).

For copper deposited from a divalent (Z=2) electrolyte such as a sulfate the above formula yields:

$$s=3.68*10^{-4} \text{(microns per mA-sec)}*j*t$$

Subsequent steps proceed as in the second embodiment to produce the final relief structure desired.

Standard Negative using Log-N Augmenting

In another particularly preferred embodiment of the invention, we may produce multiple depth relief structures in substantially fewer exposure steps than would be possible using the previous embodiments.

Figure 8A:
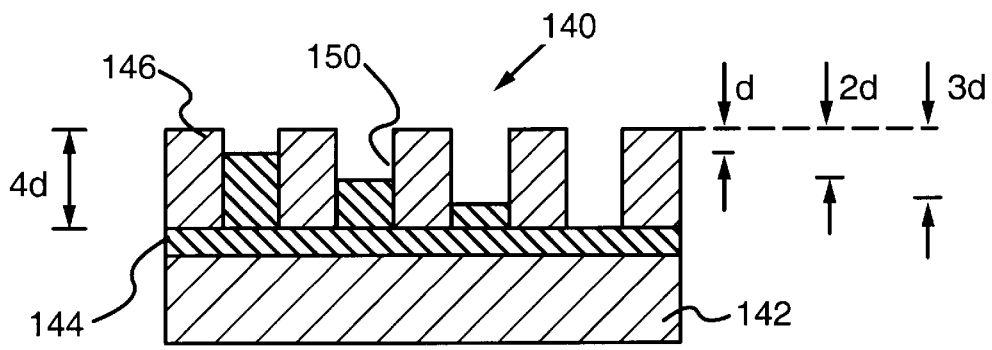
FIG. 8 are cross sectional views illustrating an embodiment with a reduced number of exposure steps.

Let us suppose that it is desired to produce a carrier with data-bearing pits of 4 evenly spaced increasing depths. Let us assume for a simple case that all the depths are multiples of some smallest distance d, thus the depth sequence is d, 2*d, 3*d, 4*d. The desired structure 140 is depicted in FIG. 8A. It is substantially the same as in the previous embodiment and is comprised of a substrate 142 on which is a metal film 144, a "screen" layer of negative photoresist or PMMA 146, and possesses the desired data bearing pits 150 in the sequence of depths given above.

Figure 8B:
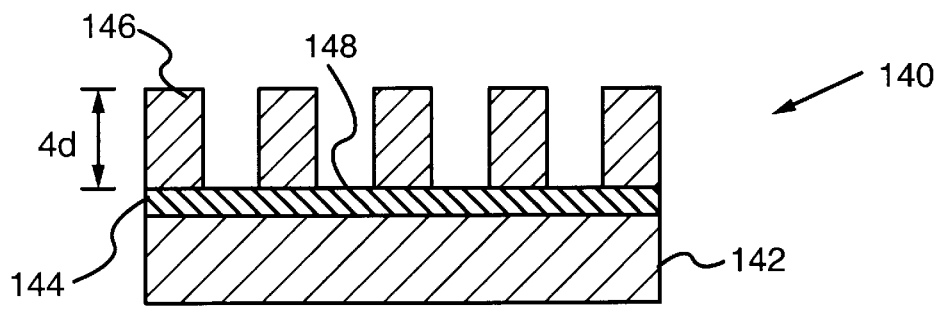
Figure 8C:
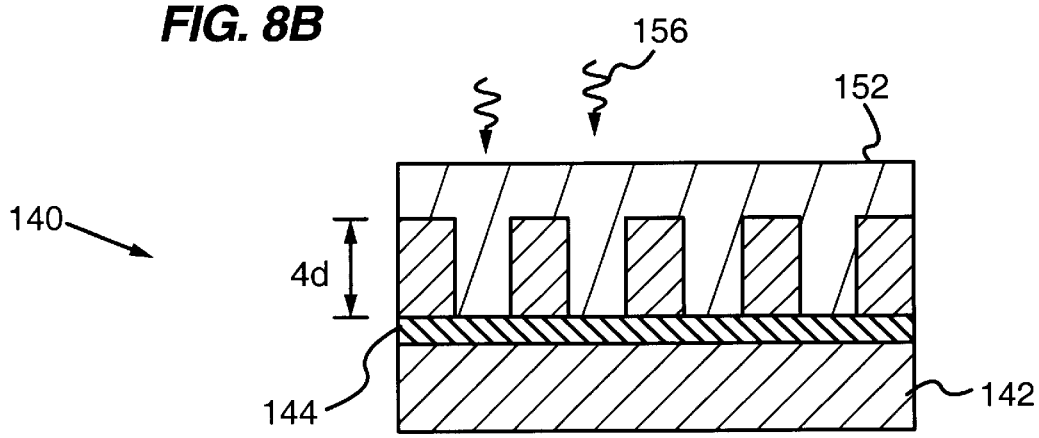
Figure 8D:
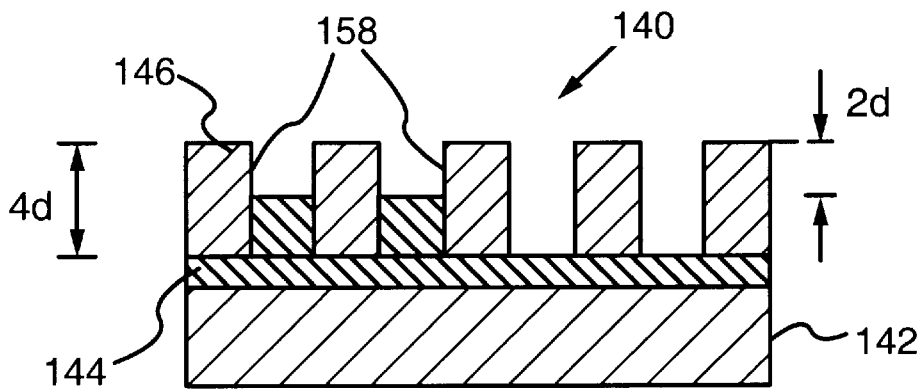

To prepare this structure, we begin with a blank master 140 prepared as in the immediately preceding embodiment with a "screen" layer of PMMA or negative photoresist with all holes 148 having a depth of 4*d. This is shown in FIG. 8B. The blank master is then coated with positive photoresist 152 and exposed with the radiation pattern 156 as shown in FIG. 8C. The exposure may be carried out with either masks or "track-and-burn" apparatus 102 depicted in FIG. 6. After development of the positive photoresist the master is electroplated as in the immediately preceding embodiment with a constant current density j\, for a period of time 2*t\ such that a thickness of metal 2*d is deposited. The result after stripping is shown in FIG. 8D. The leftmost pits 158 now are 2*d deep.

Figure 8E:
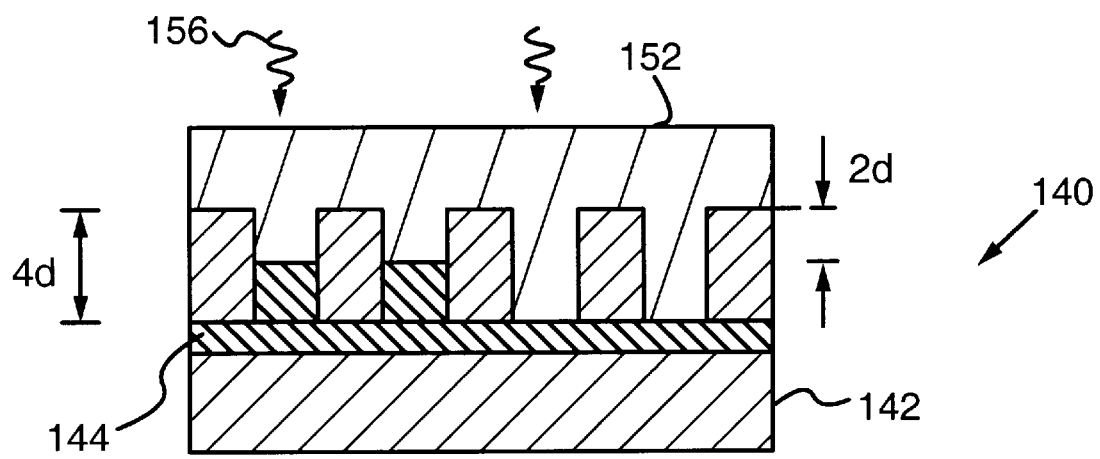

Next, the master is recoated with positive photoresist 152 and exposed with the radiation pattern 160 depicted in FIG. 8E. After development the master is electroplated as before with current density j\, for a period of time t\. As a result a thickness of metal d is deposited. After stripping the positive photoresist the final desired pit pattern 150 is obtained as shown in FIG. 8A.

The algorithm is thus clear, any data carrier requiring $2^N$ depths may be created in only N exposures. Further, the depths need not be uniformly spaced. If all depths desired $d_1$, $d_2$, $d_3$, ... $d_M$ can be expressed as the sums of a discrete set of depths { $d_\alpha$, $d_\beta$, $d_\gamma$, ... $d_\Omega$} then the mastering can be carried out in at most Log$_2$M or $\Omega$ exposures, whichever is the larger integer.

Returning to the simple case of uniformly spaced depths: 1*d, 2*d, 3*d ... N*d, with a "screen" layer N*d thick, the thicknesses of electroplated metal required to raise the floor of each pit are, respectively: (N−1)*d, (N−2)*d ... 0*d. Thus for pit of depth k*d, the required thickness is (N−k)*d. To calculate the correct exposure pattern to achieve this depth, we need only write (N−k) in base 2 and examine the binary digits to decide whether the pit should be exposed or not on a particular electroplating step.

Let us consider a master of 64 evenly spaced depths from 1*d to 64*d. Let us examine in detail the above algorithm to decide on which electroplating steps the pit must be open. There are, of course, 6 electroplating cycles required all at j\ current density for periods of 32*t\, 16*t\, 8*t\, 4*t\, 2*t\ and t\. For a typical pit depth, e.g., 53*d, we write (N−k)= (64−53) in base 2 to yield 001011. (Most significant bits on the left.) We thus see that the pit must be open for the 8*t\, 2*t\, t\ and electroplating cycles to yield a deposit of 11*d thick and thus a pit 53*d deep.

As is evident, if a positive relief structure is desired (mesas) the preceding embodiment may be carried out and the "screen" layer then stripped by either chemical agents such as Microstrip or by plasma ashing.

Screen via Anodization

Figure 9A:
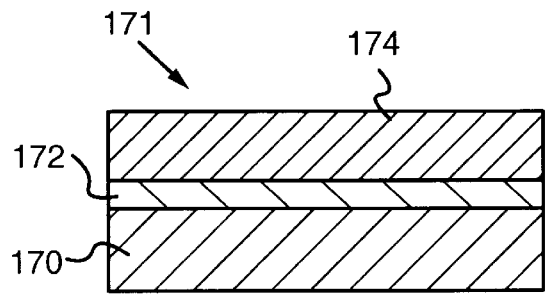
FIG. 9 are cross sectional views illustrating the production of an all-refractory blank master.
Figure 9B:
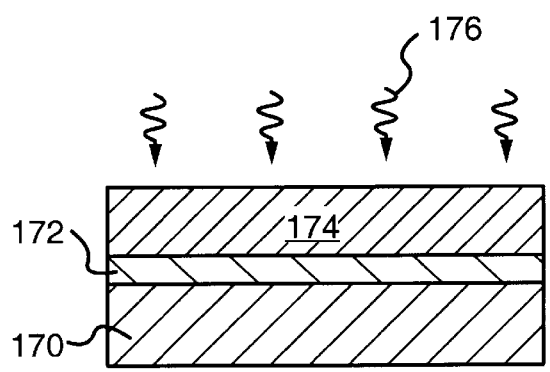
Figure 9C:
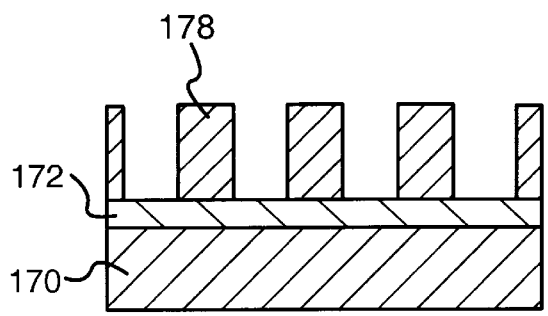
Figure 9D:
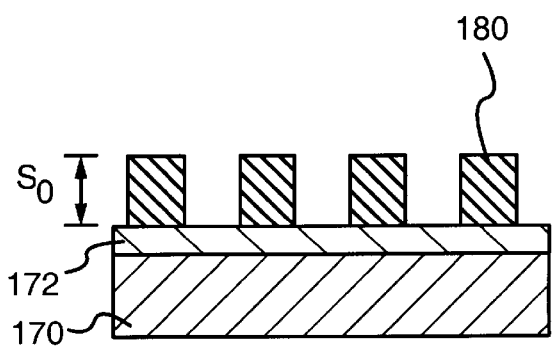

In another embodiment of the invention, we may produce a blank master 171 entirely of refractory materials without use of a less durable PMMA or negative photoresist layer. We begin with a suitable substrate 170 coated with a "valve" metal film 172 and positive photoresist layer 174. This is depicted in FIG. 9A. Next, we expose master 171 with radiation pattern 176 as shown in FIG. 9B. After development photoresist remains only in the un-illuminated regions 178 as shown in FIG. 9C. Master 171 is then placed in the electrolytic cell depicted in FIG. 5 and anodized to produce an oxide layer 180 of thickness $S_0$ as shown after photoresist stripping in FIG. 9D. This oxide layer now will serve as the "screen" layer former made of PMMA or negative photoresist as was discussed at length in the second embodiment. The pits, it should be noted, are in the formerly un-illuminated regions 178.

Blank master 171 thus prepared may be then further re-coated with "selector" layers of positive photoresist and reanodized as desired in substantially the same fashion as described in the second embodiment so long as a the distance $S_0$ is larger than the largest of all subsequent oxide thickness S* to be grown in the pits by a numerical factor we shall now describe in detail.

The key issue in re-anodization is that all oxide surfaces are ionic conductors and must be considered as potential current sinks. Therefore, in order to have well known current densities in the data-bearing pits in this case, the total current sunk into the rest of the carrier surface must be negligible. This may be arranged by noting the logarithmic relation between voltage and current in the equation discussed in the first embodiment. If we use fitted numerical factors from the 94° C. Tantalum data in FIG. 5 the equation is:

$$log_{10}(j/j_{00})=-16.04+250.0*V/s$$

where $j_{00}$ is a standard current density of 1 A/cm$^2$. Let us take an extreme case where the pits open on any given selection run comprise only 10% of the carrier surface area, and we wish the pit current to dominate by a factor of 100 or so, thus ensuring that non-pit oxide growth is utterly negligible. In that case:

$$log_{10}(j_{pit}/j_{00})=log_{10}(j_{non-pit}/j_{00})+3.0$$

If the desired current density for pits spit is 1 mA and the greatest pit floor thickness desired is S*=2490 Å, then we may solve for the greatest voltage the process will produce, it is 129.8 Volts. We may now solve for the thickness $S_0$ which corresponds to a jnonpit $10^3$ times smaller than this jpit. This is $S_0$=3233 Å, which exceeds S* by a factor of about 1.3. Thus it is clear that under these conditions we may produce any negative relief structure desired, so long as we do not attempt to fill the pits more than 75% full.

Summary, Ramifications, and Scope

The presented embodiments only outline the many ways in which the present invention can be implemented. In practice, many types and geometrical shapes of optical data carriers can be produced. For example, due to their inherent compatibility with flexible metal ribbons, tapes may be easily produced as data carriers. The method can also be used to produce conventional CD-ROMs with interleaved tracks of different depths as an extension of the first embodiment. Also, the method can be used to fabricate optical carriers having a guide groove with preformatted pits via anodization, or a guide groove with preformatted pits via electroplating.

Therefore, the scope of the invention should be determined, not by examples given, but by the appended claims and their legal equivalents.

I claim:

1. A method for making a master for making optical information carriers having a relief structure, said relief structure representing data, said method comprising the following steps:
   a) depositing a first photoresist layer on a metal layer;
   b) exposing said first photoresist layer to a first radiation pattern;
   c) developing said first photoresist layer, thereby exposing screen portions of said metal layer;
   d) depositing by anodization an oxide screen layer on said screen portions of said metal layer, said screen layer having a thickness $s_0$;
   e) removing said first photoresist layer from said metal layer, thereby creating a blank master comprising said metal layer and said screen layer, wherein said screen layer covers said screen portions of said metal layer and leaves a superset of open regions of said metal layer exposed, said superset comprising a first set of open regions and other open regions;
   f) depositing a first selector layer of photoresist on said blank master;
   g) exposing said selector layer to a second radiation pattern;
   h) developing said first selector layer, thereby exposing said first set of open regions of said metal layer;
   i) depositing by anodization a first oxide data layer of thickness s on said first set of open regions of said metal layer, said thickness s representing a first data value; and
   j) removing said first selector layer;
wherein said step of depositing said first oxide data layer comprises the step of applying a constant anodization voltage V until an anodization current density falls to a value j.

2. The method of claim 1, further comprising the following steps:
   a) depositing a second selector layer of photoresist on said master;
   b) exposing said second selector layer to a third radiation pattern;
   c) developing said second selector layer, thereby exposing a second set of open regions of said metal layer;
   d) depositing by anodization a second oxide data layer of thickness s' on said second set of open regions of said metal layer, said thickness s' representing a second data value; and
   e) removing said second selector layer.

3. The method of claim 1, wherein $s_0/s>1.3$.

4. The method of claim 1, wherein said metal layer comprises a metal selected from the group consisting of: tantalum, niobium, aluminum, zirconium, hafnium, tungsten, bismuth, antimony, beryllium, magnesium, silicon, germanium, tin, titanium, and uranium.

5. A method for making a master for making optical information carriers having a relief structure, said relief structure representing data, said method comprising the following steps:
   a) depositing a first photoresist layer on a metal layer;
   b) exposing said first photoresist layer to a first radiation pattern;
   c) developing said first photoresist layer, thereby exposing screen portions of said metal layer;
   d) depositing by anodization an oxide screen layer on said screen portions of said metal layer, said screen layer having a thickness $s_0$;
   e) removing said first photoresist layer from said metal layer, thereby creating a blank master comprising said metal layer and said screen layer, wherein said screen layer covers said screen portions of said metal layer and leaves a superset of open regions of said metal layer exposed, said superset comprising a first set of open regions and other open regions;
   f) depositing a first selector layer of photoresist on said blank master;
   g) exposing said selector layer to a second radiation pattern;
   h) developing said first selector layer, thereby exposing said first set of open regions of said metal layer;
   i) depositing by anodization a first oxide data layer of thickness s on said first set of open regions of said metal layer, said thickness s representing a first data value; and
   j) removing said first selector layer;
wherein said step of depositing said first oxide data layer comprises the step of applying a constant anodization current until an anodization voltage rises to a value V, wherein said value V is proportional to said thickness s.

6. The method of claim 5, further comprising the following steps:
   a) depositing a second selector layer of photoresist on said master;
   b) exposing said second selector layer to a third radiation pattern;
   c) developing said second selector layer, thereby exposing a second set of open regions of said metal layer;
   d) depositing by anodization a second oxide data layer of thickness s' on said second set of open regions of said metal layer, said thickness s' representing a second data value; and
   e) removing said second selector layer.

7. The method of claim 5, wherein $s_0/s>1.3$.

8. The method of claim 5, wherein said metal layer comprises a metal selected from the group consisting of: tantalum, niobium, aluminum, zirconium, hafnium, tungsten, bismuth, antimony, beryllium, magnesium, silicon, germanium, tin, titanium, and uranium.

9. The method of claim 5, wherein said metal layer comprises niobium, and wherein s/V=1.5 nm/Volt.

* * * * *